United States Patent Office 2,973,929
Patented Mar. 7, 1961

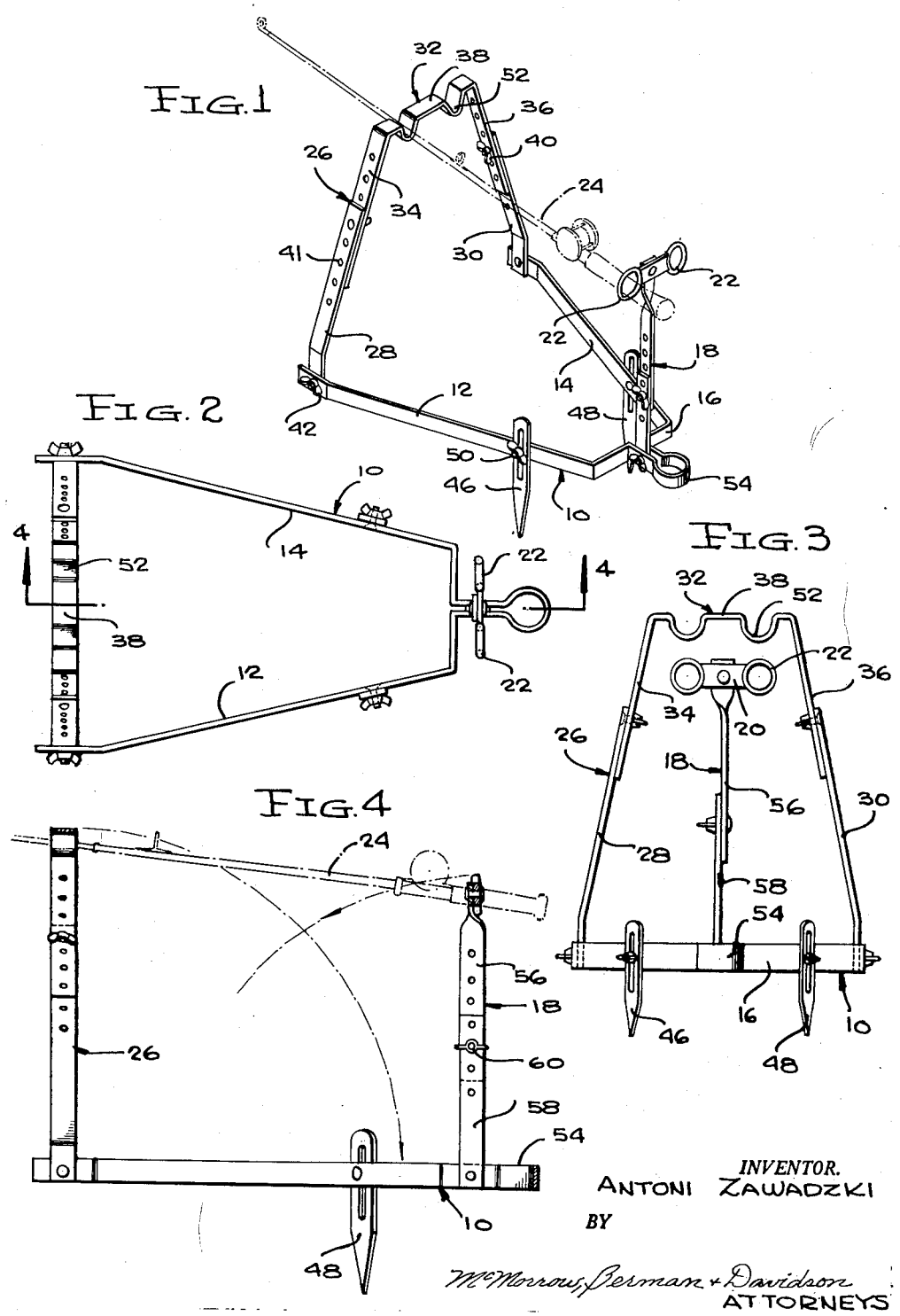

2,973,929

FISHING ROD HOLDER

Antoni Zawadzki, 43 B St., Buffalo, N.Y.

Filed Apr. 12, 1960, Ser. No. 21,753

3 Claims. (Cl. 248—39)

The present invention relates to equipment for a fisherman generally and in particular to a holder for supporting a fishing rod while fishing in a body of water.

Previously proposed and presently in use are holders for fishing poles or rods which are designed primarily to hold a fishing pole or rod so that the user thereof may occupy himself with other matters while fishing in a body of water. Not all of such solders that have been designed or are in use are entirely satisfactory to the people who use them. A principal defect is that the holders are cumbersome, are difficult to assemble and disassemble, do not fold up compactly enough for storage along with the other fishing equipment, and may not be manufactured at a cost which is reasonable with respect to the cost of other fishing equipment. As the use of a fishing pole or rod holder is only occasional with most people, its size and compactness when folded should be a prime consideration in the manufacture. However, if too compact or provided with telescoping parts, it becomes a nuisance to extend the parts or to unfold the holder to an operative position.

An object of the present invention is to provide a fishing rod holder which is readily extended from the nested or compact condition to the operative position and as readily collapsed from the operative position to the nested position.

Another object of the present invention is to provide a fishing rod holder which is inexpensive to construct, one which may be manufactured in quantity at reasonable cost and on ordinary metal forming machines, and one which is highly effective in action.

These and other objects and advantages of the present invention will be fully apparent from the following description when taken in conjunction with the annexed drawing, in which:

Figure 1 is an isometric view of the holder of the present invention in operative position, a fishing rod being shown in dotted lines and supported on the holder;

Figure 2 is a top plan view of the assembly shown in Figure 1, with the fishing rod removed;

Figure 3 is an end elevational view; and

Figure 4 is a side view partially in section, the dotted line showing the path of movement of the upright at one end of the holder and the support at the other end of the holder.

Referring in greater detail to the drawing in which like numerals indicate like parts throughout the several views, the reference numeral 10 designates generally a frame formed for the most part out of flat strip rigid material which can be bent, twisted, and drilled. The frame 10 includes a pair of legs 12 and 14 arranged in lateral spaced relation and having a bar member 16 connecting one of the adjacent ends of the legs 12 and 14 together.

An upright 18 is positioned adjacent the midportion of the bar member 16 and is connected to the bar member 16 for movement from the upright position to a lay-down position within the frame 10, this movement being designated by dotted lines and an arrow in Figure 4.

A flat strip 20, arranged horizontally and in substantial longitudinal alignment with respect to the bar member 16, is secured to the upper end of the upright 18 and carries on its ends ring members 22. Each ring member 22 is adapted to receive therethrough the butt end of a fishing rod, as shown in Figure 1, the fishing rod being designated generally by the reference numeral 24.

The frame 10 includes an upstanding support, designated generally by the reference numeral 26. The support 26 includes a vertically disposed arm 28 positioned adjacent the end of the leg 12 remote from the bar member 16 and having its lower end connected to the adjacent end of the leg 12 for pivotal movement of the arm 28 from the vertical position to a nested position within the frame 10, this movement also being shown in Figure 4 and indicated by an arrow and a dotted line.

Another vertically disposed arm 30 is positioned adjacent the end of the leg 14 remote from the bar member 16 and has its lower end connected to the adjacent end of the leg 14 for pivotal movement of the arm 30 from the vertical position to a nested position within the frame 10.

An inverted U-shaped member 32 is arranged so that the lower end portions of the legs 34 and 36 extend along and abuttingly engage the upper end portions of the arms 28 and 30, respectively, with the bight 38 bridging and above the upper ends of the arms 28 and 30.

Means, embodying bolt and wing nut assemblies 40, secure the lower end portions of the legs 34 and 36 to the upper end portions of the arms 28 and 30, respectively, each of the legs 34 and 36 and each of the arms 28 and 30 being provided with a plurality of spaced holes 41 therealong and providing means by which the support 26 may be lengthened or shortened as desired.

Other means, embodying bolt and wing nut assemblies 42, adjustably connect the lower ends of the arms 28 and 30 to the free ends of the frame legs 12 and 14 for adjustable pivotal movement of the support 26 relative to the frame 10. Another bolt and wing nut assembly 44 connects the lower end of the upright 18 to the bight or bar member 16 of the U-shaped frame 10.

On each of the legs 12 and 14, inwardly of and spaced from the bight 16 is a spike element 46, 48, respectively, and adjustably secured thereto by other bolt and wing nut assemblies 50.

Rest means, embodying downwardly struck saddles 52, are provided in the bight 38 of the U-shaped support member 32. The bar member 16 is formed with a loop 54 which serves as a finger grip means for carrying the holder after the upright 18 has been moved to the lay-down position and the support 26 has been moved to the lay-down position nested within the frame 10.

The upright 18 is formed in two sections, an upper section 56 and a lower section 58 adjustably secured together by means of another bolt and wing nut assembly 60.

In use, the holder is quickly and with facility opened from the nested position to the position in which both the upright and the support are vertical or approximately so as desired and each bolt and wing nut assembly is easily and quickly loosened and tightened to secure the upright 18 and support 26 at the desired heighth and angle to the frame 10. The spike elements 46 and 48 are easily swung from the nested position (not shown) to the vertical position for driving into a ground surface when the frame 10 has been placed in a position of rest upon a ground surface. When erected, the holder with ease and facility receives and supports a fishing rod as at 24 in Figures 1 and 4 and permits fishing in a body of water without constant attendance on the rod and fishing line.

What is claimed is:

1. A fishing rod holder comprising a frame adapted to rest upon a ground surface, said frame including a pair of legs arranged in lateral spaced relation and having a bar member connecting one of the adjacent ends of said legs together, an upright positioned adjacent said bar member and connected to said bar member for movement from the upright position to a lay-down position within said frame, an upstanding support including a vertically disposed arm positioned adjacent each of the other ends of said legs, the lower ends of said arms being connected to the other ends of said legs for pivotal movement of said arms from the vertical position to a nested position within said frame, an inverted U-shaped member arranged so that the lower end portions of its legs extend along and abuttingly engage the upper end portions of said arms with the bight bridging and above the upper ends of said arms, means adjustably securing the lower ends of said arms to the other ends of said frame legs, a ring member on the upper end of said upright adapted to receive the butt end of a fishing rod, and rest means on the bight of said U-shaped member for releasably holding a fishing rod when the butt end thereof is received in said ring member.

2. A fishing rod holder comprising a frame adapted to rest upon a ground surface, said frame including a pair of legs arranged in lateral spaced relation and having a bar member connecting one of the adjacent ends of said legs together, an upright positioned adjacent said bar member and connected to said bar member for movement from the upright position to a lay-down position within said frame, an upstanding support including a vertically disposed arm positioned adjacent each of the other ends of said legs, the lower ends of said arms being connected to the other ends of said legs for pivotal movement of said arms from the vertical position to a nested position within said frame, an inverted U-shaped member fabricated of strip material and arranged so that the lower end portions of its legs extend along and abuttingly engage the upper end portions of said arms with the bight bridging and above the upper ends of said arms, means embodying bolt and wing nut assemblies adjustably securing the lower ends of said arms to the other ends of said frame legs, a ring member on the upper end of said upright adapted to receive the butt end of a fishing rod, and rest means embodying downwardly struck saddles on the bight of said U-shaped member for releasably holding a fishing rod when the butt end thereof is received in said ring member.

3. A fishing rod holder comprising a frame adapted to rest upon a ground surface, said frame including a pair of legs arranged in lateral spaced relation and having a bar member connecting one of the adjacent ends of said legs together, an upright embodying a pair of elongated sections arranged in aligned abutting relation and adjustably secured together positioned adjacent said bar member and connected to said bar member for movement from the upright position to a lay-down position within said frame, an upstanding support including a vertically disposed arm positioned adjacent each of the other ends of said legs, the lower ends of said arms being connected to the other ends of said legs for pivotal movement of said arms from the vertical position to a nested position within said frame, an inverted U-shaped member fabricated of strip material and arranged so that the lower end portions of its legs extend along and abuttingly engage the upper end portions of said arms with the bight bridging and above the upper ends of said arms, means embodying bolt and wing nut assemblies adjustably securing the lower ends of said arms to the other ends of said frame legs, a ring member on the upper end of said upright adapted to receive the butt end of a fishing rod, and rest means embodying downwardly struck saddles on the bight of said U-shaped member for releasably holding a fishing rod when the butt end thereof is received in said ring member.

References Cited in the file of this patent
UNITED STATES PATENTS

| | | |
|---|---|---|
| 440,727 | Sheafe | Nov. 18, 1890 |
| 1,091,491 | Ebur | Mar. 31, 1914 |
| 1,192,313 | Howell | July 25, 1916 |
| 2,899,155 | Rogers | Aug. 11, 1959 |